(12) United States Patent
Yang

(10) Patent No.: US 10,786,735 B2
(45) Date of Patent: Sep. 29, 2020

(54) PROMPT METHOD AND RELATED APPARATUS IN VIRTUAL SCENE, AND COMPUTER STORAGE MEDIUM

(71) Applicant: Tencent Technology (Shenzhen) Company Limited, Shenzhen (CN)

(72) Inventor: Weiqing Yang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 23 days.

(21) Appl. No.: 16/372,152

(22) Filed: Apr. 1, 2019

(65) Prior Publication Data

US 2019/0224568 A1 Jul. 25, 2019

Related U.S. Application Data

(63) Continuation of application No. PCT/CN2017/114558, filed on Dec. 5, 2017.

(30) Foreign Application Priority Data

Dec. 6, 2016 (CN) .......................... 2016 1 1110493

(51) Int. Cl.
*A63F 13/533* (2014.01)
*A63F 13/56* (2014.01)
(Continued)

(52) U.S. Cl.
CPC ........ *A63F 13/533* (2014.09); *A63B 71/0669* (2013.01); *A63F 13/35* (2014.09);
(Continued)

(58) Field of Classification Search
USPC .......................................................... 463/31
See application file for complete search history.

(56) References Cited

U.S. PATENT DOCUMENTS 7,768,527 B2 * 8/2010 Zhang ................... G06T 19/006
345/619
8,196,132 B2 * 6/2012 Ergo ....................... G06F 3/011
717/121
(Continued)

FOREIGN PATENT DOCUMENTS

CN 101063989 A 10/2007
CN 102043890 A 5/2011
(Continued)

OTHER PUBLICATIONS

International Search Report for corresponding Application PCT/CN2017/114558 dated Jan. 16, 2018.
(Continued)

*Primary Examiner* — Pierre E Elisca
(74) *Attorney, Agent, or Firm* — Brinks Gilson & Lione

(57) ABSTRACT

The present disclosure provides a prompt method and a related apparatus in a virtual scene, and a computer storage medium. The method includes obtaining, by a device comprising a memory and a processor in communication with the memory, at intervals of a preset duration or when a specified event occurs within a life cycle of a virtual scene, performance data of a plurality of virtual characters in the virtual scene within a specified time period. The method also includes determining, by the device, a best-performing virtual character currently in a best performance state in the plurality of virtual characters according to the performance data of the plurality of virtual characters within the specified time period. The method further includes generating and outputting, by the device, prompt information used for indicating the best-performing virtual character, so that a client corresponding to each virtual character in the plurality of virtual characters presents the prompt information.

20 Claims, 15 Drawing Sheets

(51) Int. Cl.
  *G06T 13/40* (2011.01)
  *A63F 13/35* (2014.01)
  *A63F 13/798* (2014.01)
  *A63F 13/46* (2014.01)
  *A63B 71/06* (2006.01)

(52) U.S. Cl.
  CPC .............. *A63F 13/46* (2014.09); *A63F 13/56* (2014.09); *A63F 13/798* (2014.09); *G06T 13/40* (2013.01); *A63F 2300/308* (2013.01); *A63F 2300/558* (2013.01)

(56) References Cited

U.S. PATENT DOCUMENTS

2009/0113389 A1* 4/2009 Ergo .................. H04N 21/8543
                                                            717/120
2019/0333265 A1* 10/2019 Kim ........................ H04L 29/06

FOREIGN PATENT DOCUMENTS

| CN | 103729059 A | 4/2014 |
| CN | 104881230 A | 9/2015 |
| CN | 105117296 A | 12/2015 |
| CN | 106512398 A | 3/2017 |
| JP | 2007-222509 A | 9/2007 |
| JP | 2014-171869 A | 9/2014 |

OTHER PUBLICATIONS

Office Action dated Jul. 21, 2020 for Japanese Application No. 2019-526236, 10 pages.

* cited by examiner

Vanguard Crash Spear

PROMPT METHOD AND RELATED APPARATUS IN VIRTUAL SCENE, AND COMPUTER STORAGE MEDIUM

RELATED APPLICATION

This application claims priority to International PCT Patent Application No. PCT/CN2017/114558, filed on Dec. 5, 2017, which claims priority to Chinese Patent Application No. 201611110493.X, filed with the Chinese Patent Office on Dec. 6, 2016, both of which are incorporated by reference in their entireties.

FIELD OF THE TECHNOLOGY

The present disclosure relates to the field of computer technologies, and in particular, to a prompt method and a related apparatus in a virtual scene, and a computer storage medium.

BACKGROUND OF THE DISCLOSURE

Game, simulation, and other types of applications may provide a participable virtual scene for a user, and the user may perform activities in the virtual scene by using a created virtual object. For example, in multiplayer online battle arena (MOBA) games, each user may control, by using a client application (alternatively referred to as a client), a virtual object to fight together with teammates.

After a life cycle of the virtual scene ends, the user learns about its performance status. However, such a manner has the following disadvantage: the performance status is a final status of the whole game, therefore time relevance is low.

The present disclosure describes a method and apparatus to address at least some of the drawbacks as mentioned above, so as to improve gaming technology in related computer technology.

SUMMARY

An objective of the present disclosure is to provide a prompt method and a related apparatus in a virtual scene, and a computer storage medium, configured to present a performance status of a virtual character in real time, so as to adjust an action policy in real time and improve time validity.

To achieve the foregoing objective, the present disclosure provides the following solutions:

According to one aspect, an embodiment of this disclosure provides a method for providing prompt information in a virtual scene. The method includes obtaining, by a device comprising a memory and a processor in communication with the memory, at intervals of a preset duration or when a specified event occurs within a life cycle of a virtual scene, performance data of a plurality of virtual characters in the virtual scene within a specified time period. The method also includes determining, by the device, a best-performing virtual character currently in a best performance state in the plurality of virtual characters according to the performance data of the plurality of virtual characters within the specified time period. The method further includes generating and outputting, by the device, prompt information used for indicating the best-performing virtual character, so that a client corresponding to each virtual character in the plurality of virtual characters presents the prompt information.

According to another aspect, an embodiment of the present disclosure provides an apparatus to provide prompt information in a virtual scene. The apparatus includes a memory storing instructions and a processor in communication with the memory. The instructions, when executed by the processor, cause the apparatus to obtain, at intervals of a preset duration or when a specified event occurs within a life cycle of a virtual scene, performance data of a plurality of virtual characters in the virtual scene within a specified time period. The instructions, when executed by the processor, also cause the apparatus to determine a best-performing virtual character currently in a best performance state in the plurality of virtual characters according to the performance data of the plurality of virtual characters. The instructions, when executed by the processor, further cause the apparatus to generate prompt information used for indicating the best-performing virtual character currently in the best performance state and output the prompt information, so that a client corresponding to each virtual character in the plurality of virtual characters presents the prompt information.

According to still another aspect, an embodiment of the present disclosure provides a non-transitory computer readable storage medium storing instructions. The instructions, when executed by a processor, cause the processor to obtain, at intervals of a preset duration or when a specified event occurs within a life cycle of a virtual scene, performance data of a plurality of virtual characters in the virtual scene within a specified time period. The instructions, when executed by a processor, cause the processor to determine a best-performing virtual character currently in a best performance state in the plurality of virtual characters according to the performance data of the plurality of virtual characters. The instructions, when executed by a processor, also cause the processor to generate prompt information used for indicating the best-performing virtual character currently in the best performance state. The instructions, when executed by a processor, further cause the processor to output the prompt information, so that a client corresponding to each virtual character in the plurality of virtual characters presents the prompt information.

In the solutions provided in the present disclosure, the performance data of the virtual characters is obtained in real time within the life cycle of the virtual scene, the performance status of each virtual character is determined according to the performance data, and the prompt information indicating the virtual character currently in the best performance state is output. Compared with the existing technology, a feedback is more timely and time validity is higher. Thus, a user may subsequently adjust an action policy or gaming strategies within the life cycle according to the prompt information.

BRIEF DESCRIPTION OF THE DRAWINGS

To describe the technical solutions in the embodiments of the present disclosure or the existing technology more clearly, the following briefly describes the accompanying drawings required for describing the embodiments. The accompanying drawings and the following description show merely some exemplary embodiments of the present disclosure, and a person of ordinary skill in the art may derive other drawings from these accompanying drawings without creative efforts.

DESCRIPTION OF EMBODIMENTS

The embodiments of the present disclosure provide a prompt method and a related apparatus in a virtual scene, to improve time validity.

The related apparatus in the embodiments of the present disclosure includes a prompt apparatus, a terminal device, a server, and a prompt system.

Figure 1:
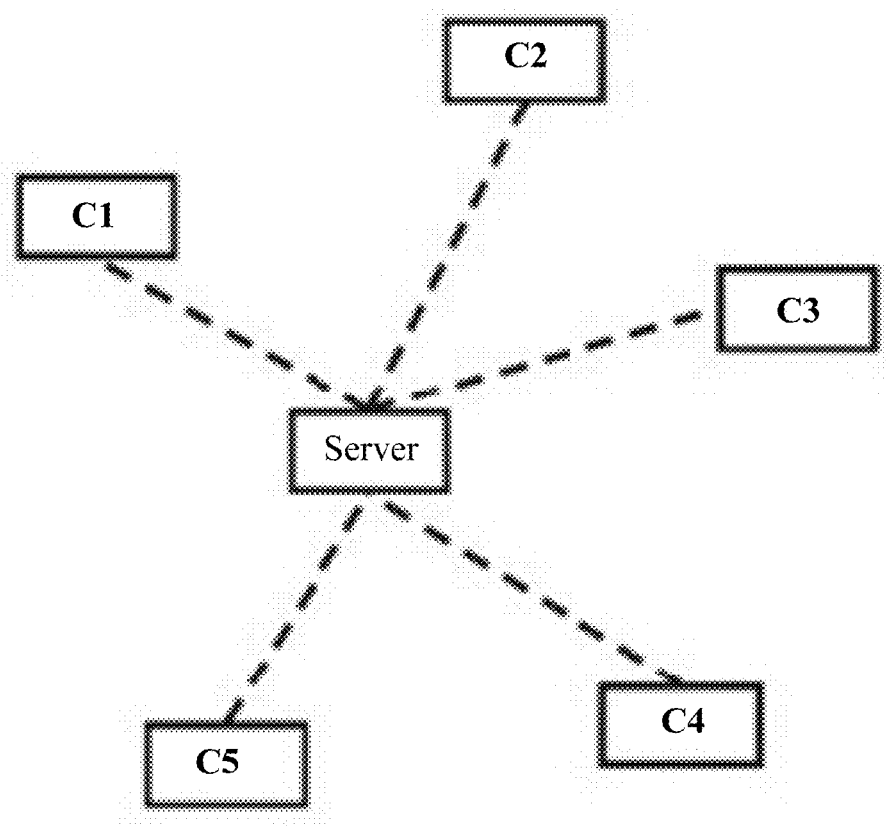
FIG. 1 is a schematic diagram of an application scene according to an embodiment of the present disclosure.

FIG. 1 shows an exemplary structure of the prompt system, including a plurality of terminal devices C1 to C5 that accesses a same virtual scene, so that some users of the plurality of terminal devices may participate in the same virtual scene with their corresponding virtual characters. The server may be connected to the plurality of terminal devices C1 to C5.

Any one device of the terminal devices C1 to C5 may be a handheld device, an in-vehicle device, a wearable device, a computing device, or a positioning device that has a wireless communication function, or another processing device connected to a wireless modem, and various forms of user equipment (UE), mobile stations (MS), mobile phones, tablet computers, desktop computers, personal digital assistants (PDA), and the like.

Clients may be deployed on the various terminal devices. In a participable virtual scene provided by game, simulation, and other types of applications for a user, the user may control, by using the client, a virtual character (a virtual object or a virtual role) to perform activities in the virtual scene.

The server is responsible for providing services for accessors (that is, the terminal devices or the clients) on a network, for example, broadcasting, in a next frame, a frame synchronization command sent by a certain client to all the clients. The clients perform a corresponding operation after receiving the frame synchronization command.

The next frame for the virtual scene may be a frame for a next time point which need to be displayed on displays of the terminal devices, or the next frame for the virtual scene may be a frame for a next time point including information which need to be updated on the displays of the terminal devices.

In the prompt system shown in FIG. 1, the prompt apparatus may be applied in the terminal devices or the server in a software or hardware manner. That is, for the prompt system shown in FIG. 1, the prompt method in a virtual scene provided in the present disclosure may be performed by the terminal device (by means of communicating with the server), or the prompt method in a virtual scene provided in the present disclosure may be performed by the server.

Figure 2:
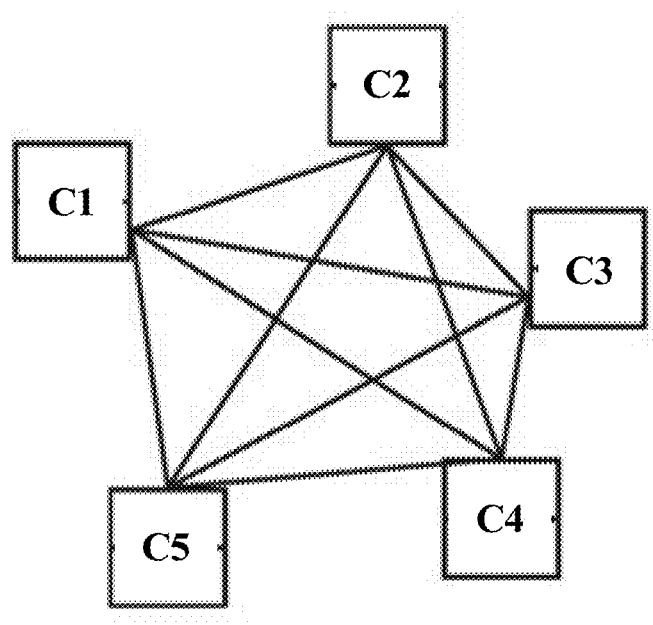
FIG. 2 is a schematic diagram of an application scene according to an embodiment of the present disclosure.

FIG. 2 shows another exemplary structure of the foregoing prompt system.

Different from the prompt system shown in FIG. 1, the prompt system shown in FIG. 2 does not include a server. The terminal devices combine a function of the server shown in FIG. 1.

When a client generates a frame synchronization command, the client may broadcast, in a next frame, the frame synchronization instruction to all clients, so that all the clients perform an operation according to the frame synchronization command.

Prompt information referred to in the following is also carried by the frame synchronization command.

In the prompt system shown in FIG. 2, the prompt apparatus may be applied in any terminal device in a software or hardware manner.

It should be noted that, FIG. 1 and FIG. 2 each exemplarily show five terminal devices, but in an actual application scenario, the number of the terminal devices is not limited to five, and may be less or more.

Figure 3:
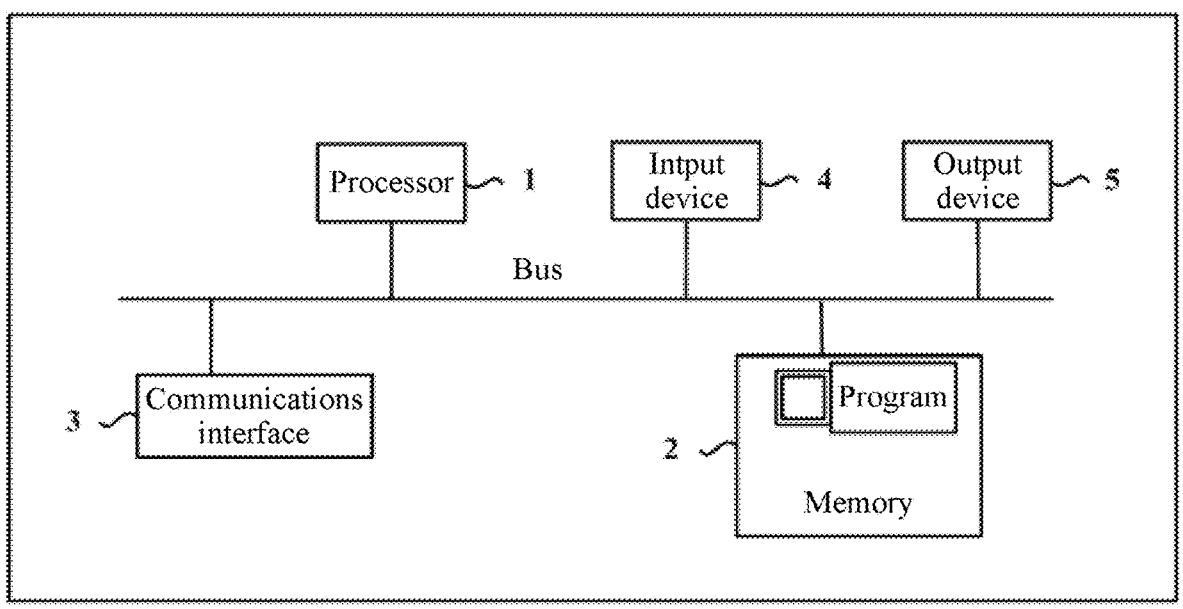
FIG. 3 is an exemplary structural diagram of a prompt apparatus in a virtual scene according to an embodiment of the present disclosure.

FIG. 3 is an exemplary structural diagram of the foregoing terminal device/server/prompt apparatus which, as shown in FIG. 3, may include a bus, a processor 1, a memory 2, a communications interface 3, an input device 4, and an output device 5. The processor 1, the memory 2, the communications interface 3, the input device 4, and the output device 5 are connected by using the bus.

The bus may include a channel used for transferring information between components of a computer system.

The processor 1 may be a general purpose processor, for example, a general purpose central processing unit (CPU), a network processor (NP), or a microprocessor, or may be an application-specific integrated circuit (ASIC), or one or more integrated circuits configured to control execution of a program in the solutions of the present disclosure, or may be a digital signal processor (DSP), an ASIC, a field programmable gate array (FPGA), or another programmable logic device, a discrete gate, a transistor logic device, or a discrete hardware component.

In an example, the processor 1 may include a main processor, a baseband chip, and a modem.

The memory 2 stores a program used for performing the technical solutions of the present disclosure, and may also store an operating system and another key service. Specifically, the program may include program code, and the program code includes a computer operation instruction. More specifically, the memory 2 may include a read-only memory (ROM), a static storage device of another type that can store static information and an instruction, a random access memory (RAM), a dynamic storage device of another type that can store information and an instruction, a magnetic disk memory, a flash memory, or the like.

The input device 4 may include an apparatus that receives data and information input by a user, for example, a keyboard, a mouse, a camera, a scanner, a light pen, a voice input apparatus, a touchscreen, a pedometer, or a gravity sensor.

The output device 5 may include an apparatus that allows outputting information to the user, for example, a display screen, or a speaker.

The communications interface 3 may include an apparatus that uses any transceiver, so as to communicate with another device or a communications network, for example, Ethernet, a radio access network (RAN), or a wireless local area network (WLAN).

The processor 1 executes the program stored in the memory 2 and calls another device, so that the processor 1 may be configured to implement the prompt method in a virtual scene provided in the present disclosure.

Figure 4:
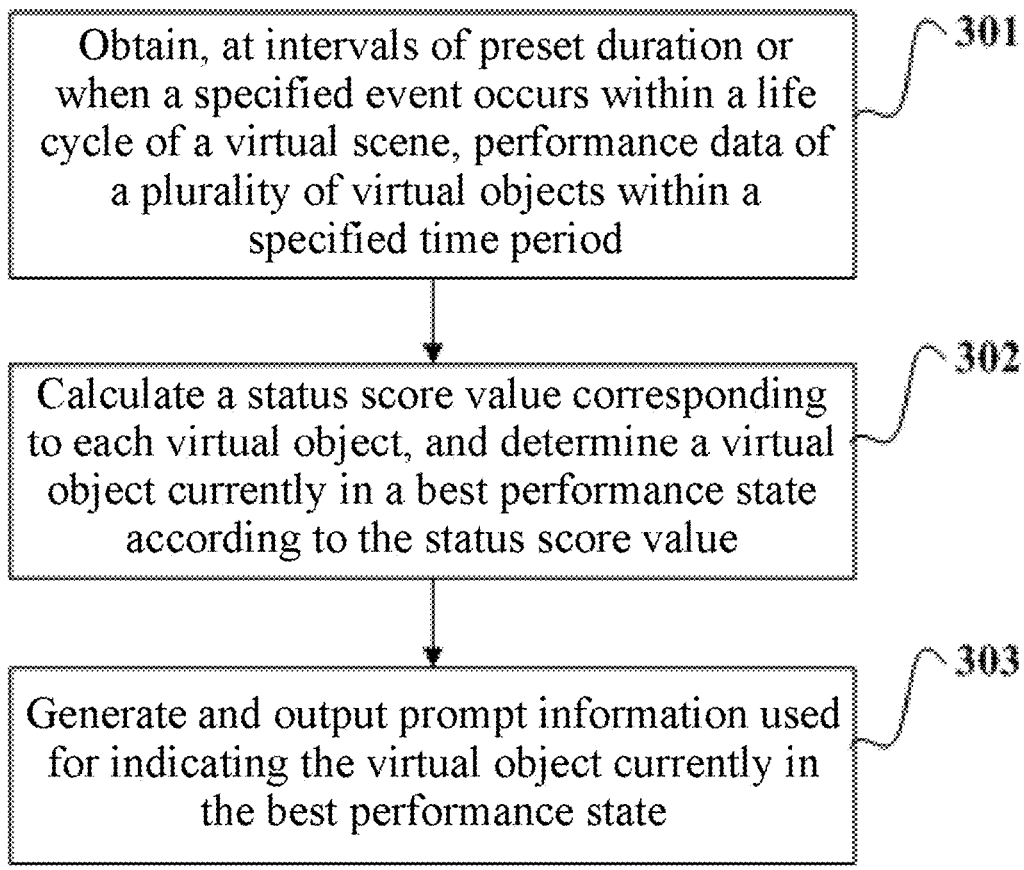
FIG. 4 is an exemplary flowchart of a prompt method in a virtual scene according to an embodiment of the present disclosure.

FIG. 4 shows an exemplary procedure of the foregoing prompt method in a virtual scene. The method shown in FIG. 4 may be applied in the application scene in FIG. 1 or FIG. 2, and may be completed by the processor 1 in the terminal device or the server shown in FIG. 3 by means of interacting with another device.

The exemplary procedure includes the following parts.

Part 301: Obtain, at intervals of a preset duration or when a specified event occurs within a life cycle of the virtual scene, performance data of a plurality of virtual characters in the virtual scene within a specified time period.

The preset duration may be flexibly designed according to a specific situation. For example, the preset duration may be 1 second, 10 seconds, 20 seconds, 1 minutes, 5 minutes, and etc. Therefore, the performance data of the virtual characters may be designed to be obtained at intervals of the preset duration, for example, 20 seconds.

Alternatively, the performance data of the virtual characters may be obtained when a specific condition is satisfied (or when a specific event occurs). For example, the performance data may be obtained when a certain chain or stage arrives. More specifically, a bowling game may be used as an example. The performance data of the virtual characters may be obtained after a virtual character rolls each virtual bowling ball (in this case, the specific event is rolling the virtual bowling ball). Alternatively, the performance data of the virtual characters may be separately obtained when 30%, 50%, and 80% of a building of one party (a player or a team of players) or the other party is damaged (in this case, the specific event includes that 30%, 50%, and 80% of the building of one party or the other party is damaged).

Part 302: Calculate a performance score (or a status score value) corresponding to each virtual character according to performance data of each virtual character, and determine a virtual character currently in a best performance state in the plurality of virtual characters according to the performance score.

The virtual character currently in the best performance state in the plurality of virtual characters according to their corresponding performance score may be designated as the best-performing virtual character.

The performance score is used for representing a performance status of the corresponding virtual character.

In an example, the virtual characters may be sorted according to the performance score of each virtual character, and first N (N is a positive integer greater than or equal to 1) virtual characters are used as the virtual characters currently in the best performance state.

In another example, a virtual character having the highest performance score is used as the virtual character currently in the best performance state. For example, there are three virtual characters in total in the virtual scene, and current performance scores of the three virtual characters are respectively 10, 20, and 30. A virtual character whose performance score is 30 (N equals 1) is the virtual character currently in the best performance state. Alternatively, virtual characters whose performance scores are respectively 30 and 20 (N equals 2) may be used as the virtual characters currently in the best performance state.

When N is larger than one, the plurality of virtual characters currently in the best performance state in the plurality of virtual characters according to their corresponding performance score may be designated as the best-performing virtual characters.

The following describes how to calculate the performance score of the virtual character according to the performance data.

Part 303: Generate and output prompt information used for indicating the virtual character currently in the best performance state.

In another embodiment, the prompt information may further include the performance score of each virtual character.

The prompt information, after being generated, may be broadcast to a client corresponding to a virtual character in the virtual scene. In one embodiment, the prompt information may be broadcast to every client corresponding to each virtual character of the plurality of virtual characters in the virtual scene. In another embodiment, the prompt information may be broadcast to every client corresponding to a portion of selected virtual characters of the plurality of virtual characters in the virtual scene, for example but not limited to, selected virtual characters having top 25% of performance scores, selected virtual characters having top 50% of performance scores, or selected virtual characters having bottom 25% of performance scores.

In addition, if there is audience, the prompt information may be broadcast to the audience. The audience may be inactive virtual characters in the virtual scene, or the audience may be other virtual characters in a same game but not in the same virtual scene.

It can be learned that, in the solutions provided in the present disclosure, the performance data of the virtual characters is obtained in real time within the life cycle of the virtual scene, the performance score (score value) of each virtual character is determined according to the performance data, and the prompt information indicating the virtual character currently in the best performance state is output. Compared with the existing technology, a feedback is more timely and time validity is higher. Thus, a user may subsequently adjust an action policy or gaming strategies within the life cycle according to the prompt information.

The following further makes detailed descriptions based on the system architecture shown in FIG. 1 according to the foregoing common aspects in the present disclosure.

Figure 5:
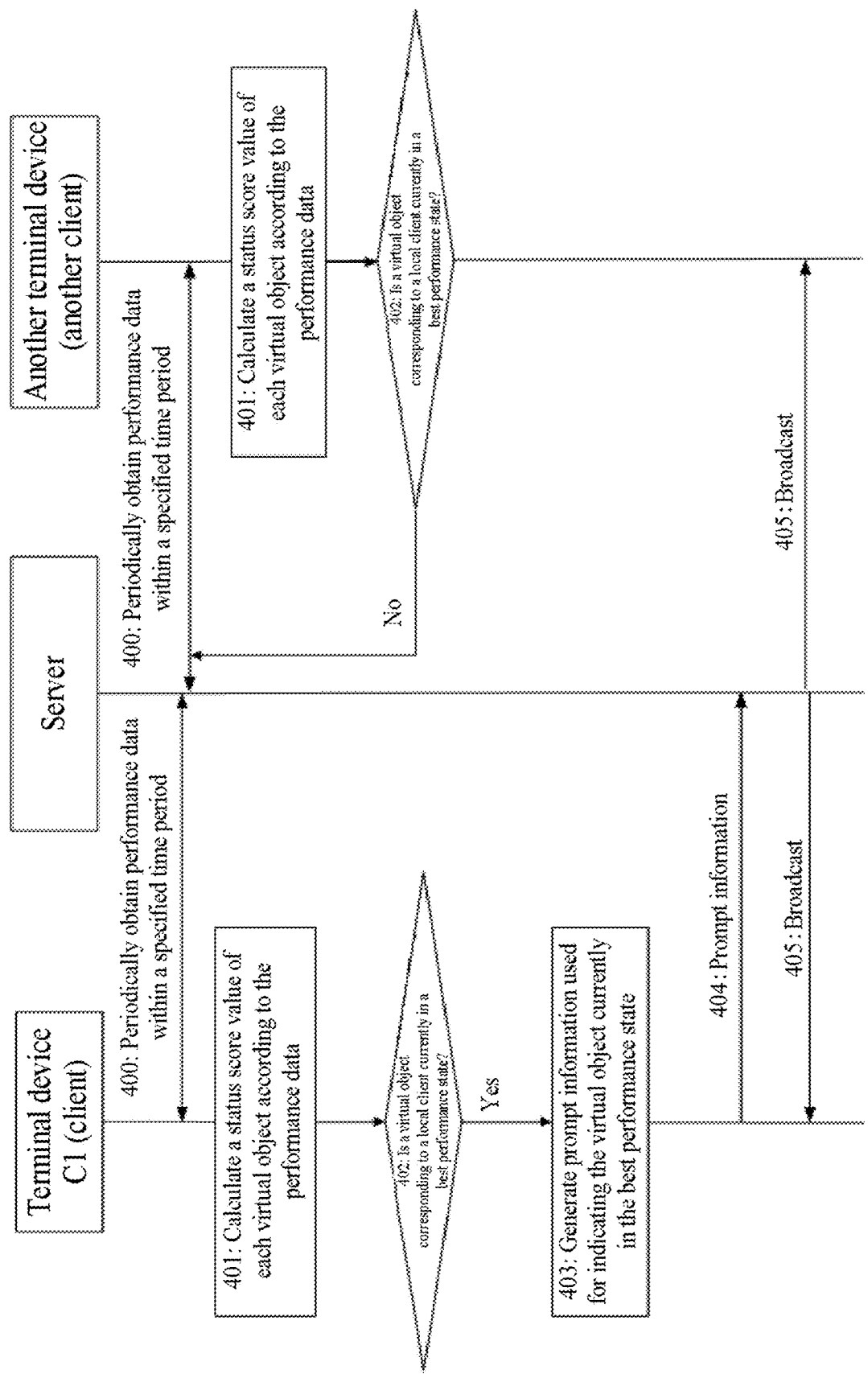
FIG. 5 is an exemplary flowchart of a prompt method in a virtual scene according to an embodiment of the present disclosure.

FIG. 5 shows an exemplary procedure of the foregoing prompt method in a virtual scene. The interaction method shown in FIG. 5 is applied in the application scene in FIG. 1, and is completed by the processor 1 in the terminal device shown in FIG. 3 by means of interacting with another device.

The method shown in FIG. 5 may be applied to a multi-person virtual scene, for example, a MOBA. The method shown in FIG. 5 may be applied to any terminal device in C1 to C5. In this embodiment, descriptions are made from a perspective of the terminal C1 shown in FIG. 1.

The foregoing interaction procedure includes the following parts.

Part 400: The processor 1 of the terminal device C1 periodically obtains, within a life cycle of the virtual scene, performance data of each virtual character in the virtual scene within a specified time period.

A game is used as an example, and the start to the end of the game is one life cycle. When the game starts again, a new life cycle starts.

The periodically obtaining performance data may specifically mean obtaining the performance data at intervals of preset duration. For example, the performance data is obtained at intervals of 30 seconds. Assuming that there are five virtual characters in total in the virtual scene, performance data of the five virtual characters are obtained at intervals of 30 seconds.

In one embodiment, a starting time point of the specified time period may be a starting time point of the life cycle, and an end time point is a current time point. Assuming that a game starts at 10:00:00, and the performance data of each virtual character is obtained at intervals of 30 seconds. Performance data obtained at 10:00:30 is performance data of each virtual character between 10:00:00 to 10:00:30, because 10:00:00 is the starting time point of the life cycle and 10:00:30 is the current time point as the end time point. For another example, performance data obtained at 10:01:30 is performance data of each virtual character between 10:00:00 to 10:01:30, because 10:00:00 is the starting time point of the life cycle and 10:01:30 is the current time point as the end time point.

In another embodiment, a starting time point of the specified time period is a time point at which a performance status of the virtual character is determined last time (or a time point at which the performance data is obtained last time, or a time point at which a performance score is calculated last time), and an end time point is a current time point. Still assuming that a game starts at 10:00:00, and the performance data of each virtual character is obtained at intervals of 30 seconds. Performance data obtained at 10:00:30 is performance data of each virtual character between 10:00:00 to 10:00:30, because 10:00:00 is the starting time of the life cycle as the time point at which the performance score is calculated last time and 10:00:30 is the current time point as the end time point. For another example, performance data obtained at 10:01:30 is performance data of each virtual character between 10:01:00 to 10:01:30, because 10:01:00 is the time point at which the performance score is calculated last time and 10:01:30 is the current time point as the end time point.

The performance data is used for reflecting an ability of the virtual character, and the performance data includes a parameter that measures the ability of the virtual character and a parameter value. In different scenes, content of the performance data is different. For example, in a speed competition game, the parameter that measures the ability of the virtual character and that is included in the performance data is a current speed or an average speed. A speed value corresponding to the current speed is f, and a speed value corresponding to the average speed is n. In some other game scenes, the performance data may include at least one of a KDA value, a kill participation ratio, and a damage share.

K in KDA value refers to kill, that is, the current number of kills; D refers to dead, that is, the current number of deaths; and A refers to assist, that is, the number of assists. KDA value may be calculated by using the formula: (K+A)/D.

The performance data of each virtual character in the specified time period may be calculated by the server shown in FIG. 1. Specifically, each client may unsolicitedly report the performance data, and the server collects and calculates the performance data.

Alternatively, in some scenes, the server manages the KDA value, the kill participation ratio, and the damage share.

In this embodiment, the prompt method in the virtual scene is performed by any terminal device (for example, the terminal device C1) shown in FIG. 1. The processor 1 of the terminal device shown in FIG. 1 may communicate with the server by using the communications interface 3, to obtain the performance data of each virtual character in the virtual scene within the specified time period.

In another embodiment, if the prompt method in the virtual scene is performed by the server shown in FIG. 1, the processor of the server directly obtains the performance data of each virtual character.

Part 401: The processor 1 of the terminal device C1 calculates a performance score corresponding to each virtual character according to the performance data of each virtual character.

An example in which performance data of a certain virtual character includes a KDA value, a kill participation ratio, and a damage share is used. A performance score of the virtual character may be calculated by using the following formula:

$$V = w0*KDA + w1*CR + w2*POR.$$

V represents the performance score, w0 to w2 represent weights, and certainly, the weight may be 1. CR represents the kill participation ratio, and POR represents the damage share.

A person skilled in the art may also design a different calculation manner for calculating the performance score. Details are not described herein.

In another embodiment, if the prompt method in the virtual scene is performed by the server shown in FIG. 1, the processor of the server directly executes the part 401.

Part 402: The processor 1 of the terminal device C1 determines, according to the performance scores of the plurality of virtual characters, whether a virtual character corresponding to a local client is currently in a best performance state.

In an example, the virtual characters may be sorted according to the performance score of each virtual character, and a virtual character that ranks first is used as the virtual character in the best performance state.

The client then determines whether the virtual character that ranks first is the same as the virtual character corresponding to the local client, if yes, determines that the virtual character corresponding to the local client is in the best performance state, and if no, determines that the virtual character corresponding to the local client is not in the best performance state.

For example, assuming that the virtual character corresponding to the local client is a virtual character A, and the virtual character that ranks first is a virtual character B, it is determined that the virtual character corresponding to the local client is not in the best performance state.

In another example, the client can directly determine whether the performance score of the virtual character corresponding to the local client is the highest, if yes, determines that the virtual character corresponding to the local client is in the best performance state, and if no, determines that the virtual character corresponding to the local client is not in the best performance state.

In some scenes, the virtual character in the best performance state may be referred to as the Most Valuable Player (MVP). The MVP is originally an award given to the best performing player of the whole season of the National Basketball Association (NBA), and currently, is widely used in various (competitive) games and matches to refer to the best performing player (contestant).

Part 403: Generate prompt information used for indicating the virtual character in the best performance state if the virtual character corresponding to the local client is currently in the best performance state.

It should be noted that the part 403 is performed only when the client determines that the virtual character corresponding to the local client is in the best performance state. If determining that the virtual character corresponding to the local client is not in the best performance state, the client may not execute the part 403, and return to the part 400.

Part 404: The processor 1 of the terminal device C1 outputs the prompt information to the server by using the communications interface 3.

In a scene of frame synchronization, the terminal device may add the prompt information into a frame synchronization command, and sends the frame synchronization command to the server.

It should be noted that the frame synchronization is a manner of front and back end data synchronization, and is usually applied to a network game that requires for high time validity.

A process of the frame synchronization may be simply described as follows:

Each client uploads an operation instruction set (that is, the frame synchronization command) in real time.

The server saves these operation instruction sets and broadcasts, in a next frame, the operation instruction sets to all the clients.

The clients respectively perform operations in the instruction sets in a frame order after receiving the instruction sets.

In another embodiment, if the prompt method in the virtual scene is performed by the server shown in FIG. 1, the part 404 is not performed.

Part 405: The server broadcasts the prompt information to each terminal device.

The server may broadcast to the client corresponding to each virtual character in the virtual scene. In addition, if there is audience, the prompt information may be broadcast to the audience.

In this embodiment, the processor of the server shown in FIG. 1 may execute the part 405 by using the communications interface.

In this embodiment, a current MVP may be periodically selected, and there is only one "current MVP" in a current round at a same time.

The following specifically describes content of the prompt information.

Each player may designate a presentation image such as a badge, or an avatar before a game starts. In this embodiment, an example in which the presentation image is a badge is used for description.

In this case, when the player is selected as the current MVP, the presentation image (for example, the badge) of the player may be presented. More specifically, the designated badge may be displayed besides a health bar of a virtual character controlled by the player selected as the current MVP, and a badge is not displayed besides a health bar of a virtual character controlled by another player.

Figure 6:
FIG. 6 to FIG. 23 are each a schematic diagram of a badge according to an embodiment of the present disclosure.
Figure 7:
Figure 8:

The player may obtain various badges. For example, in a certain game scene, a certain user (that is, player) may obtain an MVP-related primary honorary title shown in FIG. 6 when obtaining the MVP (a current MVP or a global MVP) for 5 times; obtain an MVP-related intermediate honorary title shown in FIG. 7 when obtaining the MVP for 100 times; and obtain an MVP-related high-level honorary title shown in FIG. 8 when obtaining the MVP for 500 times.

Figure 9:
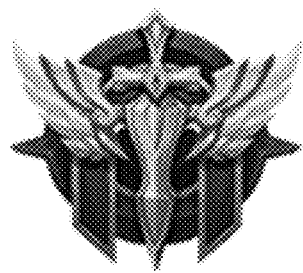
Figure 10:
Figure 11:
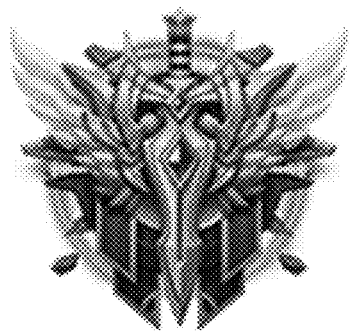

For another example, the user (player) may obtain a damage-related primary honorary title shown in FIG. 9 when "damaging a hero most" for 5 times; obtain a damage-related intermediate honorary title shown in FIG. 10 when "damaging a hero most" for 100 times; and obtain a damage-related high-level honorary title shown in FIG. 11 when "damaging a hero most" for 500 times.

The damaging a hero herein refers to damaging a hero of the opposite party.

Figure 12:
Figure 13:
Figure 14:

For another example, the user (player) may obtain a kill-related primary honorary title shown in FIG. 12 when "killing the most people" for 5 times; obtain a kill-related intermediate honorary title shown in FIG. 13 when "killing the most people" for 100 times; and obtain a kill-related high-level honorary title shown in FIG. 14 when "killing the most people" for 500 times.

Figure 15:
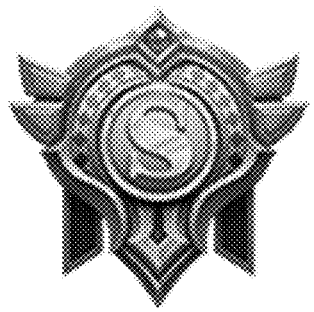
Figure 16:
Figure 17:

For another example, the user (player) may obtain a wealth-related primary honorary title shown in FIG. 15 when "obtaining most money" for 5 times; obtain a wealth-related intermediate honorary title shown in FIG. 16 when "obtaining most money" for 100 times; and obtain a wealth-related high-level honorary title shown in FIG. 17 when "obtaining most money" for 500 times.

Figure 18:
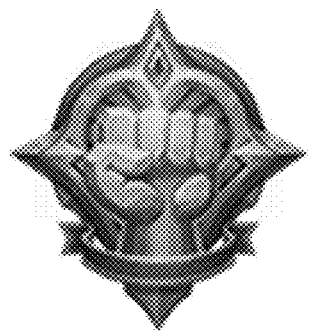
Figure 19:
Figure 20:

For another example, the user (player) may obtain an assist-related primary honorary title shown in FIG. 18 when "assisting most" for 5 times; obtain an assist-related intermediate honorary title shown in FIG. 19 when "assisting most" for 100 times; and obtain an assist-related high-level honorary title shown in FIG. 20 when "assisting most" for 500 times.

Figure 21:
Figure 22:
Figure 23:

For another example, the user (player) may obtain a tank-related primary honorary title shown in FIG. 21 when "taking most damage" for 5 times; obtain a tank-related intermediate honorary title shown in FIG. 22 when "taking most damage" for 100 times; and obtain a tank-related high-level honorary title shown in FIG. 23 when "taking most damage" for 500 times.

In conclusion, there are six types of titles in total, and each type of the honorary title has three levels which are respectively obtained when a corresponding objective is achieved for 5 times, 100 times, and 500 times.

Figure 24:
FIG. 24 is a schematic diagram of a honor data panel according to an embodiment of the present disclosure.

Content of the honorary titles are integrated into a honor data panel of the player shown in FIG. 24.

In FIG. 24, the six honorary titles respectively correspond to obtaining numbers of six achievements. When a certain title is not obtained for 5 times, a corresponding title badge is shown as "not obtain", and when a certain title is obtained for 5 times, 100 times, and 500 times, three increasingly gorgeous badges are respectively obtained.

In FIG. 24, a denominator of the "number of times" may dynamically change along with a change of a numerator number. When the numerator is less than 5, the denominator is 5; when the numerator is greater than or equal to 5 and is less than 100, the denominator is 100; when the numerator is greater than or equal to 100 and is less than 500, the denominator is 500; and when the numerator is greater than or equal to 500, the denominator disappears.

In addition, a showy change may be made to a style of a health bar of the current MVP. When a level of the badge presented by the player is higher (which means that the player obtains more corresponding honors in previous rounds), the style of the health bar of the player is more gorgeous.

In the existing technology, the badge may only be used as honor data of the player, and can be queried by the player and another player.

However, in this embodiment, the player may select (that is, designate) an badge in the "honor data" panel which the player desires to present. For example, still referring to FIG. 24, a player selects an honorary title of "Vanguard Crash Spear" that represents "damaging a hero most", and the designated badge is marked as "in use".

In this case, when the player is selected as the current MVP, the badge marked as "in use" is presented to each client.

Figure 25:
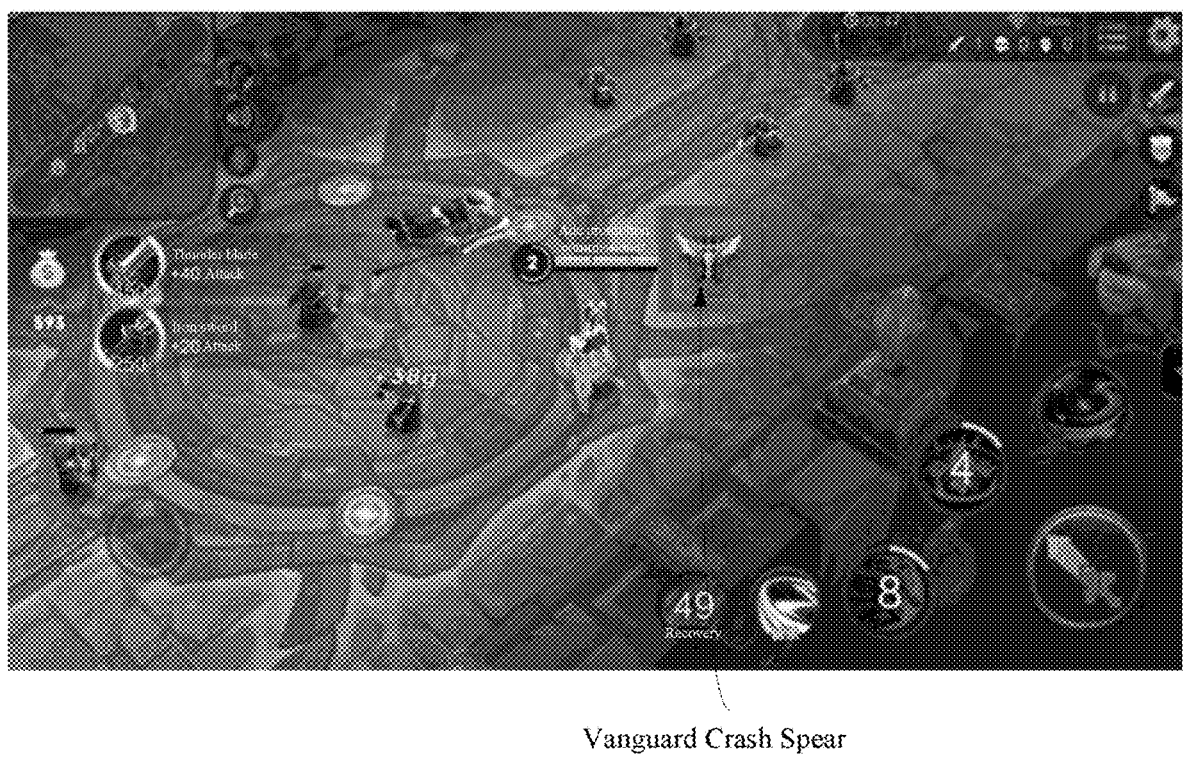
FIG. 25 is a schematic diagram of presenting a badge designated by a current MVP according to an embodiment of the present disclosure.

As shown in FIG. 25, the player is selected as the "current MVP" for killing a hero of the opposite party at a time point of 0:47 in a round, and the badge of "Vanguard Crash Spear" appears at the right of the health bar of the player.

Figure 26:
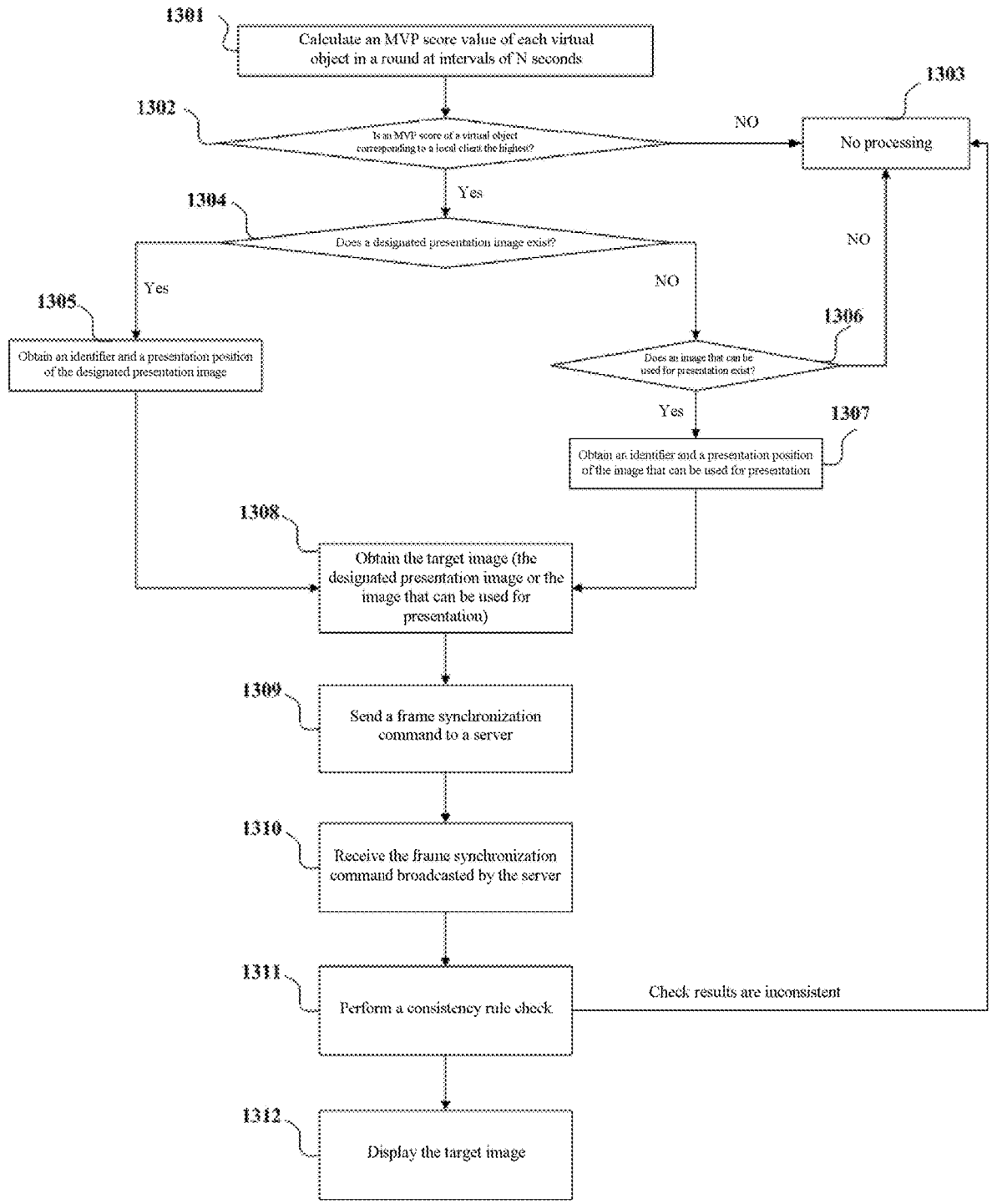
FIG. 26 is an exemplary flowchart of a prompt method in a virtual scene according to an embodiment of the present disclosure.

Based on the foregoing conception, referring to FIG. 26, FIG. 26 is still another exemplary schematic diagram of a prompt method in a virtual scene according to an embodiment of the present disclosure. The method is implemented by a processor of any terminal device (client) by means of interacting with another device, and includes the following parts.

Part 1301: After a round of game starts, a processor 1 calculates an MVP score value (that is, the foregoing performance score) of each virtual character in the round at intervals of N seconds.

In an example, the client may calculate the MVP score value according a KDA value, a kill participation ratio, and a damage share from a starting time point of the round to a current time point. The calculation formula may be MVP=w0*KDA+w1*CR+w2*POR. For specific content, refer to the description of the part 401. Details are not described herein again.

Part 1302: The processor 1 determines whether an MVP score of a virtual character corresponding to a local client is the highest; if yes, executes part 1304; otherwise, executes part 1303 or returns to the part 1301.

A player has the highest MVP score is a current MVP.

Part 1303: No processing.

That is, no badge is displayed.

Part 1304: The processor 1 determines whether a designated presentation image exists; if yes, executes part 1305; otherwise, executes part 1306.

In an example, the designated presentation image may be a badge. As described above, if the player selects a Vanguard Crash Spear badge as the presentation image before the game starts or in the game, the Vanguard Crash Spear badge may be marked as "in use".

More specifically, a mark attribute may be added to attributes of the badge. When a value of the mark attribute is a first value (for example, 1), the mark attribute represents "in use", and when the value of the mark attribute is a second value, the mark attribute represents "not in use". Whether the designated presentation image exists may be determined through determining whether there is a badge marked as "in use".

Alternatively, a presentation attribute may be added to attributes of the virtual character, and an ID of the designated badge is added to the presentation attribute. An attribute value of the presentation attribute may be obtained to determine whether the designated presentation image exists.

In addition, in another example, the presentation image may be an image of a user interface control such as a health bar. The player may select a style of the health bar before the game starts or in the game, and use the selected style of the health bar as the designated presentation image.

Part 1305: The processor 1 obtains an identifier and a presentation position of the designated presentation image.

An example in which the player designates the Vanguard Crash Spear badge in advance is still used, and an ID and a presentation position of the Vanguard Crash Spear badge may be obtained.

In an example, the presentation position may be determined by using offset coordinates of coordinates of the presentation image relative to coordinates of a reference object.

In an example, the reference object may be a virtual character controlled by the player, or the health bar of the virtual character.

The offset coordinates are fixed.

An example of the health bar is used. Assuming that the designated badge is Vanguard Crash Spear, coordinates of the health bar are (x1, y1), and the offset coordinates are (x2, y2), the coordinates of the position of the Vanguard Crash Spear badge are (x1+x2, y1+y2). After the coordinates of the position of the Vanguard Crash Spear badge are determined, the presentation position of the Vanguard Crash Spear badge is correspondingly determined.

Part 1306: The processor 1 determines whether an image that can be used for presentation exists; if yes, executes part 1307; otherwise, executes part 1303.

In another embodiment of the present disclosure, if it is determined that no image that can be used for presentation exists, the part 1303 is executed, or the part 1301 is returned to.

If the current MVP does not select a presentation badge before this round, honor data of the player may be searched for a badge already obtained by the player. If a plurality of badges exists, a badge may be randomly selected or a badge that ranks first may be selected as the image that can be used for presentation.

Part 1307: The processor 1 obtains an identifier and a presentation position of the image that can be used for presentation.

The part 1307 is similar to the part 1305, and details are not described herein again.

For ease of description, the image that can be used for presentation and the designated presentation image are collectively referred to as target image in the following.

Part 1308: The processor 1 obtains the target image.

More specifically, the target image is displayed by using the presentation position as the origin.

1305 to 1308 may specifically be executed by a user interface layer of the client.

Part 1309: The processor 1 sends a frame synchronization command to a server.

According to different situations, the frame synchronization command may include an ID and a presentation position of the target image, or may include a user ID corresponding to the local client (when there is no image that can be displayed).

Part 1310: Receive the frame synchronization command broadcast by the server.

It should be noted that, a plurality of clients may send the frame synchronization command to the server, therefore, the server may perform processing on a plurality of frame synchronization commands to generate a general frame synchronization command, and then broadcast the total frame synchronization command.

Part 1311: The processor 1 performs a consistency rule check; if check results are inconsistent, returns to the part 1303; or if check results are consistent, executes part 1312.

An objective of the consistency rule check is to check whether a current frame is synchronized with the server. For example, if the frame synchronization command of the server is for the $1000^{th}$ frame, and the frame synchronization command of the client is for the $998^{th}$ frame, the server is not synchronized with the client.

Part 1312: The processor 1 displays the target image.

The target image may be displayed according to the ID and the presentation image of the target image.

It should be noted that, in another embodiment of the present disclosure, if it is determined that no image that can be used for presentation exists, the user ID corresponding to the local client may alternatively be obtained, and subsequently, text prompt may be made. That is, if no image can be presented, the text prompt may be made, and prompt content may be: the user whose ID is XXX is the current MVP, or the like. The text prompt may be displayed in a bulletin system.

In this embodiment, a current MVP in this round up to now may be presented in real time in a single round, thereby the time validity is high. The player may become the "current MVP" any time for a splendid performance or an excellent operation. Such visual flaunt also increases impetus of the players for striving, and increases antagonism in the game.

A time validity feature of the presentation may indirectly increase fights in the game, and have a promoting effect for increasing antagonism in MOBA games.

Figure 27:
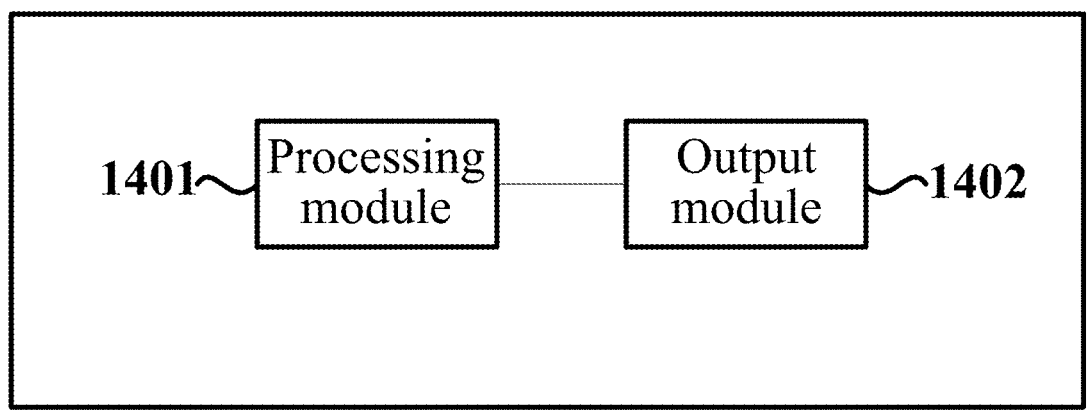
FIG. 27 is an exemplary structural diagram of a prompt apparatus in a virtual scene according to an embodiment of the present disclosure.

FIG. 27 is another possible schematic structural diagram of the terminal device or the prompt apparatus in the foregoing embodiments, including a processing module 1401 and an output module 1402.

The processing module 1401 is configured to: obtain, at intervals of preset duration or when a specified event occurs within a life cycle of the virtual scene, performance data of a virtual character in the virtual scene within a specified time period; calculate a performance score corresponding to each virtual character according to the performance data of each virtual character, the performance score being used for representing a performance status of the corresponding virtual character; determine a virtual character currently in a best performance state in the plurality of virtual characters according to the performance scores of the plurality of virtual characters; generate prompt information used for indicating the virtual character currently in the best performance state; and instruct the output module 1402 to output the prompt information.

The output module 1402 is configured to output the prompt information generated by the processing module 1401.

For related descriptions, refer to the method part in this specification. Details are not described herein again.

The processing module 1401 may be configured to execute the parts 301 and 302, and the operation of generating prompt information in the part 303 in the embodiment shown in FIG. 4; and moreover, may also execute the parts 400 to 403 in the embodiment shown in FIG. 4, and the parts 1301 to 1308 and the parts 1311 and 1312 in the embodiment shown in FIG. 26.

The output module 1402 of the terminal device or the server may be configured to perform the operation of sending the prompt information in the part 303 in the embodiment shown in FIG. 4; and moreover, may also execute the part 404 in the embodiment shown in FIG. 5, and the parts 1309 and 1310 in the embodiment shown in FIG. 26.

In addition, the output module 1402 of the server may also execute the part 405 in the embodiment shown in FIG. 5.

The steps of the method or algorithm described with reference to the disclosed content of the present disclosure may be implemented by hardware, or may be implemented by hardware executing software instructions. The software instructions may include corresponding software modules, and the software modules may be stored in a RAM, a flash memory, a ROM, an EPROM, an EEPROM, a register, a hard disk, a removable hard disk, a CD-ROM, or a storage medium of any other forms well known in the art. An exemplary storage medium is coupled to the processor, so that the processor can read information from the storage medium, and can write information into the storage medium. Certainly, the storage medium may alternatively be a composition part of the processor. The processor and the storage medium may be located in an ASIC. In addition, the ASIC may be located in user equipment. Certainly, the processor and the storage medium may alternatively exist in the user equipment as separate components.

A person skilled in the art may realize that, in the foregoing one or more examples, the functions described in the present disclosure may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general or specific computer.

In the foregoing specific implementations, the objective, technical solutions, and beneficial effects of the present disclosure are further described in detail. It should be understood that the foregoing descriptions are merely specific implementations of the present disclosure, but are not intended to limit the protection scope of the present disclosure. Any modification, equivalent replacement, or improvement made based on the technical solutions of the present disclosure should fall within the protection scope of the present disclosure.

What is claimed is:

1. A method for providing prompt information in a virtual scene, comprising:

obtaining, by a device comprising a memory and a processor in communication with the memory, at intervals of a preset duration or when a specified event occurs within a life cycle of a virtual scene, performance data of a plurality of virtual characters in the virtual scene within a specified time period;

determining, by the device, a best-performing virtual character currently in a best performance state in the plurality of virtual characters according to the performance data of the plurality of virtual characters within the specified time period; and generating and outputting, by the device, prompt information used for indicating the best-performing virtual character, so that a client corresponding to each virtual character in the plurality of virtual characters presents the prompt information.

2. The method according to claim 1, wherein the determining the best-performing virtual character currently in the best performance state in the plurality of virtual characters according to the performance data of the plurality of virtual characters within the specified time period comprises:
calculating, by the device, a performance score corresponding to each virtual character according to the performance data of each virtual character, the performance score being used for representing a performance status of the corresponding virtual character; and
determining, by the device, the best-performing virtual character currently in the best performance state in the plurality of virtual characters according to the performance scores of the plurality of virtual characters.

3. The method according to claim 2, wherein: the determining the best-performing virtual character currently in the best performance state in the plurality of virtual characters according to the performance scores of the plurality of virtual characters comprises:
determining, by the device according to the performance scores of the plurality of virtual characters, whether a virtual character corresponding to a local client is in the best performance state; and
the generating and outputting the prompt information used for indicating the best-performing virtual character comprises:
generating, by the device, the prompt information if the virtual character corresponding to the local client is in the best performance state, and
outputting, by the device, the prompt information to a client corresponding to another virtual character in the virtual scene.

4. The method according to claim 3, wherein the generating the prompt information comprises:
determining, by the device, whether a designated presentation image exists;
when it is determined that the designated presentation image exists, obtaining, by the device, an identifier and a presentation position of the designated presentation image; and
generating, by the device, the prompt information comprising the identifier and the presentation position of the designated presentation image.

5. The method according to claim 4, wherein the generating the prompt information further comprises:
when it is determined that the designated presentation image does not exists, determining, by the device, whether an image that can be used for presentation exists;
when it is determined that the image that can be used for the presentation exists, obtaining, by the device, an identifier and a presentation position of the image that can be used for presentation; and
generating, by the device, the prompt information comprising the identifier and the presentation position of the image that can be used for presentation.

6. The method according to claim 5, further comprising:
when it is determined that the image that can be used for the presentation does not exist, generating, by the device, the prompt information comprising an ID corresponding to the local client.

7. The method according to claim 3, wherein the generating and outputting the prompt information used for indicating the best-performing virtual character currently in the best performance state comprises:
generating, by the device, the prompt information; and
sending, by the device, a frame synchronization instruction, the frame synchronization instruction carrying the prompt information, so that the client corresponding to each virtual character in the plurality of virtual characters presents the prompt information after receiving the frame synchronization instruction.

8. The method according to claim 1, the method further comprising:
displaying the prompt information.

9. The method according to claim 8, wherein:
the prompt information comprises an ID and a presentation position of a presentation image; and
the displaying the prompt information comprises:
obtaining the presentation image according to the ID of the presentation image, and
displaying the presentation image at the presentation position, the presentation position corresponding to the best-performing virtual character currently in the best performance state.

10. The method according to claim 1, wherein:
a starting time point of the specified time period is a starting time point of the life cycle, or a time point at which a performance score of each virtual character is calculated last time; and
an end time point of the specified time period is a current time point.

11. The method according to claim 1, wherein the performance data comprises at least one of a KDA value, a kill participation ratio, and a damage share.

12. An apparatus to provide prompt information in a virtual scene, the apparatus comprising:
a memory storing instructions; and
a processor in communication with the memory, wherein, the instructions, when executed by the processor, cause the apparatus to:
obtain, at intervals of a preset duration or when a specified event occurs within a life cycle of a virtual scene, performance data of a plurality of virtual characters in the virtual scene within a specified time period,
determine a best-performing virtual character currently in a best performance state in the plurality of virtual characters according to the performance data of the plurality of virtual characters,
generate prompt information used for indicating the best-performing virtual character currently in the best performance state, and
output the prompt information, so that a client corresponding to each virtual character in the plurality of virtual characters presents the prompt information.

13. The apparatus according to claim 12, wherein, when the instructions cause the apparatus to determine the best-performing virtual character currently in the best performance state in the plurality of virtual characters according to the performance scores of the plurality of virtual characters, the instructions cause the apparatus to:
calculate a performance score corresponding to each virtual character according to the performance data of each virtual character, the performance score being used for representing a performance status of the corresponding virtual character; and
determine the best-performing virtual character currently in the best performance state in the plurality of virtual characters according to the performance scores of the plurality of virtual characters.

14. The apparatus according to claim 13, wherein:
when the instructions cause the apparatus to determine the best-performing virtual character currently in the best performance state in the plurality of virtual characters according to the performance scores of the plurality of virtual characters, the instructions cause the apparatus to:
determine, according to the performance scores of the plurality of virtual characters, whether a virtual character corresponding to a local client is in the best performance state; and
when the instructions cause the apparatus to generate prompt information used for indicating the best-performing virtual character currently in the best performance state and output the prompt information, so that a client corresponding to each virtual character in the plurality of virtual characters presents the prompt information, the instructions cause the apparatus to:
generate the prompt information if the virtual character corresponding to the local client is in the best performance state, and
output the prompt information to a client corresponding to another virtual character in the virtual scene.

15. The apparatus according to claim 14, wherein, when the instructions cause the apparatus to generate the prompt information, the instructions cause the apparatus to:
determine whether a designated presentation image exists;
when it is determined that the designated presentation image exists, obtain an identifier and a presentation position of the designated presentation image; and
generate the prompt information comprising the identifier and the presentation position of the designated presentation image.

16. The apparatus according to claim 12, wherein:
a starting time point of the specified time period is a starting time point of the life cycle, or a time point at which a performance score of each virtual character is calculated last time; and
an end time point of the specified time period is a current time point.

17. A non-transitory computer readable storage medium storing instructions, wherein the instructions, when executed by a processor, cause the processor to:
obtain, at intervals of a preset duration or when a specified event occurs within a life cycle of a virtual scene, performance data of a plurality of virtual characters in the virtual scene within a specified time period;
determine a best-performing virtual character currently in a best performance state in the plurality of virtual characters according to the performance data of the plurality of virtual characters;
generate prompt information used for indicating the best-performing virtual character currently in the best performance state; and
output the prompt information, so that a client corresponding to each virtual character in the plurality of virtual characters presents the prompt information.

18. The non-transitory computer readable storage medium according to claim 17, wherein when the instructions cause the processor to determine the best-performing virtual character currently in the best performance state in the plurality of virtual characters according to the performance scores of the plurality of virtual characters, the instructions cause the processor to:
calculate a performance score corresponding to each virtual character according to the performance data of each virtual character, the performance score being used for representing a performance status of the corresponding virtual character; and
determine the best-performing virtual character currently in the best performance state in the plurality of virtual characters according to the performance scores of the plurality of virtual characters.

19. The non-transitory computer readable storage medium according to claim 18, wherein:
when the instructions cause the processor to determine the best-performing virtual character currently in the best performance state in the plurality of virtual characters according to the performance scores of the plurality of virtual characters, the instructions cause the processor to:
determine, according to the performance scores of the plurality of virtual characters, whether a virtual character corresponding to a local client is in the best performance state; and
when the instructions cause the processor to generate prompt information used for indicating the best-performing virtual character currently in the best performance state and output the prompt information, so that a client corresponding to each virtual character in the plurality of virtual characters presents the prompt information, the instructions cause the processor to:
generate the prompt information if the virtual character corresponding to the local client is in the best performance state, and
output the prompt information to a client corresponding to another virtual character in the virtual scene.

20. The non-transitory computer readable storage medium according to claim 19, wherein, when the instructions cause the processor to generate the prompt information, the instructions cause the processor to:
determine whether a designated presentation image exists;
when it is determined that the designated presentation image exists, obtain an identifier and a presentation position of the designated presentation image; and
generate the prompt information comprising the identifier and the presentation position of the designated presentation image.

* * * * *